Patented June 18, 1929.

1,717,809

UNITED STATES PATENT OFFICE.

GUSTAV REDDELIEN AND WERNER MÜLLER, OF LEIPZIG, GERMANY, ASSIGNORS TO GRASSELLI DYESTUFF CORPORATION, OF NEW YORK, N. Y., A CORPORATION OF DELAWARE.

PROCESS OF OBTAINING CONDENSATION PRODUCTS OF THE ANTHRAQUINONE SERIES.

No Drawing. Application filed August 8, 1927, Serial No. 211,620, and in Germany August 4, 1926.

This invention relates to the manufacture of valuable condensation products by treating at the ordinary pressure or at raised pressure an amino-compound of the anthraquinone series with a halogen hydrin in presence of an acid-binding agent and, if desired, of a condensing agent, with or without a diluent or solvent.

The condensation products are easily soluble in organic solvents and owing to this property they are suitable, among other purposes, for dyeing cellulose esters, such as acetate silk. They are also useful as dyestuffs soluble in oil and fat. In a feebly acid bath most of them dye wool. In addition to their use as dyestuffs they may be used as parent products in the manufacture of other dyestuffs.

The following examples illustrate the invention, the parts being by weight:—

*Example 1.*—22.3 parts of 1-aminoanthraquinone are heated in a closed vessel at 150–155° C. with 40 parts of ethylenechlorhydrin and 10 parts of sodium carbonate for 5 hours. When cold the red mass is stirred with water. By recrystallizing the undissolved matter from alcohol there is obtained 1-β-hydroxyethylaminoanthraquinone in the form of red crystals of melting point 148–150° C. This compound dissolves in alcohol to a deep red solution and in ethylacetate or benzene to an orange red solution and corresponds to the most probable formula:

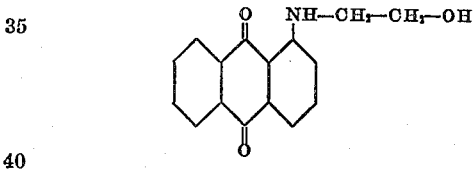

It dyes acetate silk clear red tints. It also dyes stearic acid red.

*Example 2.*—22.3 parts of 1-aminoanthraquinone are heated with 25 parts of glycerine-α-monochlorhydrin and 25 parts of 1.2-dichlorbenzene and 5.5 parts of sodium carbonate until reaction sets in, which is recognized by evolution of carbon dioxide. When the reaction lessens, the temperature is cautiously raised and the reaction is finally finished by a short boiling. From the deep red solution there crystallizes on cooling 1-β-γ-dihydroxypropylaminoanthraquinone in the form of brilliant red crystals. After recrystallization from alcohol the compound melts sharply at 192° C. It dissolves in organic solvents to a red to orange-red solution and corresponds to the most probable formula:

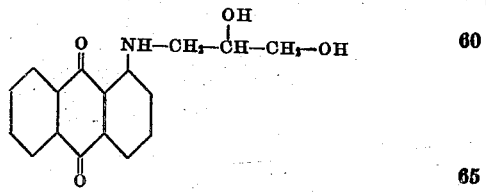

*Example 3.*—24 parts of 1-amino-4-hydroxyanthraquinone are heated to boiling with 100 parts of ethylenechlorhydrin and 13 parts of anhydrous disodium phosphate are gradually added. The colour of the solution passes gradually from deep red to violet red. After boiling for 24 hours the mass is stirred in cold water. The flocculent violet insoluble matter is separated from the liquor and purified by dissolving it in much very dilute hot sodium hydroxide solution, filtering this solution and precipitating the product by adding dilute acid. The precipitate is filtered, washed and dried. It consists of violet-black crystals of bronze lustre. For further purification it can be recrystallized from alcohol. It dissolves very easily in organic solvents to a violet to violet-red solution, corresponds to the most probable formula:

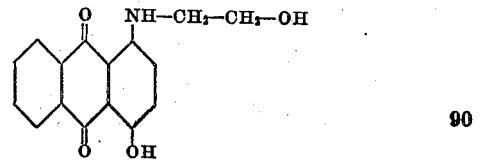

and dyes acetate silk very deep red-violet tints and stearic acid pure violet.

*Example 4.*—24 parts of 1.4-diaminoanthraquinone are dissolved by boiling in 100 parts of ethylenechlorhydrin. There are added gradually 32 parts of sodium acetate or 5 parts of magnesium oxide, so that the mass is no longer acid with mineral acid. The red violet colour of the solution passes to pure blue. The mass is poured into much water containing some sodium hydroxide and the blue flooks which separate are filtered by suction. After drying this condensation product it is a blue crystalline powder which may be recrystallized from dilute alcohol. It dissolves very easily in organic solvents to clear blue solutions and dyes acetate silk and stearic acid pure blue. In a feebly acid bath it dyes wool a beautiful blue and corresponds to the most probable formula:

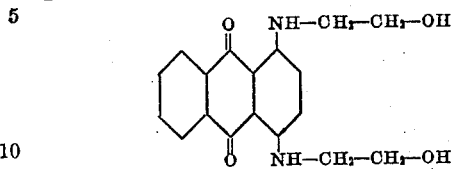

By condensing 1.5-diaminoanthraquinone with ethylenechlorhydrin or monochlorhydrin there are obtained bluish-red compounds which are soluble and behave as dyestuffs.

In like manner other amino-compounds e. g. the 1.8-diaminoanthraquinone of the anthraquinone series can be condensed with halogen hydrins.

Having now particularly described and ascertained the nature of our said invention and in what manner the same is to be performed, we declare that what we claim is:—

1. The process which comprises treating an aminoanthraquinone compound with a halogen-hydrin in the presence of an acid-binding substance.

2. The process which comprises treating an $\alpha$-amino-anthraquinone compound with a halogen-hydrin in the presence of an acid-binding substance.

3. The process which comprises heating an $\alpha$-amino-anthraquinone compound with ethylenechlorhydrin in the presence of an acid-binding substance.

In testimony whereof, we affix our signatures.

GUSTAV REDDELIEN.
WERNER MÜLLER.